US006533303B1

(12) United States Patent
Watson

(10) Patent No.: US 6,533,303 B1
(45) Date of Patent: Mar. 18, 2003

(54) MANUAL RETRACTING BOX STEP FOR PICK-UP TRUCKS

(75) Inventor: Brad E. Watson, Sharin (CA)

(73) Assignee: Decoma International Inc., Concord (CA)

( * ) Notice: Subject to any disclaimer, the term of this patent is extended or adjusted under 35 U.S.C. 154(b) by 0 days.

(21) Appl. No.: 09/980,575

(22) PCT Filed: May 10, 2000

(86) PCT No.: PCT/CA00/00548

§ 371 (c)(1),
(2), (4) Date: Oct. 31, 2001

(87) PCT Pub. No.: WO00/68037

PCT Pub. Date: Nov. 16, 2000

Related U.S. Application Data

(60) Provisional application No. 60/133,282, filed on May 10, 1999.

(51) Int. Cl.[7] .................................................. B60R 3/00
(52) U.S. Cl. ........................................ 280/166; 182/150
(58) Field of Search .............................. 280/163, 164.1, 280/164.2, 166; 182/150, 88, 91, 92, 183; 293/102, 122, 128, 155; 296/29, 146, 151, 50, 57, 62

(56) References Cited

U.S. PATENT DOCUMENTS

| | | | |
|---|---|---|---|
| 2,492,068 A | | 12/1949 | Schofield et al. |
| 2,583,894 A | * | 1/1952 | Shuck ..................... 280/164.2 |
| 2,653,036 A | | 9/1953 | Creel et al. |
| 3,329,443 A | | 7/1967 | Lowder et al. |
| 3,751,068 A | * | 8/1973 | Green ........................ 280/166 |
| 3,762,742 A | | 10/1973 | Bucklen |
| 3,817,554 A | * | 6/1974 | Cuffe et al. .................... 182/88 |
| 3,833,240 A | * | 9/1974 | Weiler ........................ 182/88 |
| 3,891,261 A | | 6/1975 | Finneman |
| 3,915,475 A | * | 10/1975 | Casella et al. ............... 182/120 |
| 3,955,827 A | * | 5/1976 | Wonigar ..................... 105/445 |
| 4,073,502 A | * | 2/1978 | Frank et al. ................. 280/166 |
| 4,093,257 A | | 6/1978 | Tarvin |
| 4,180,143 A | | 12/1979 | Clugston |
| 4,249,634 A | | 2/1981 | Potts |
| 4,412,686 A | | 11/1983 | Fagrell |
| 4,462,486 A | | 7/1984 | Dignan |
| 4,623,160 A | * | 11/1986 | Trudell ........................ 182/127 |
| 4,750,753 A | * | 6/1988 | Dezern ........................ 224/497 |

(List continued on next page.)

FOREIGN PATENT DOCUMENTS

DE 29 10 812 A1 10/1980

Primary Examiner—Brian L. Johnson
Assistant Examiner—Bridget Avery
(74) Attorney, Agent, or Firm—Clark Hill PLC

(57) ABSTRACT

The step assembly (20) includes a mounting bracket (26) mounted to an under-carriage of the pick-up truck. A step (30) is pivotally secured to the mounting bracket. The step can rotate between a stowed position with the step disposed adjacent the mounting bracket and an operative position with the step extending from the bracket. A coil spring is mounted between the bracket and the step for continuously biasing the step toward the stowed position. A ratchet mechanism, having a pawl, a cam and an over-center spring, is mounted between the bracket and the step. The ratchet mechanism locks the step in the operative position in response to rotation of the step from the stowed position to the operative position. When in the operative position, a user can stand on the step assembly to access the bed of the pick-up truck. The ratchet mechanism also unlocks the step in response to over rotation of the step beyond the operative position. Once unlocked, the step automatically counter rotates back to the stowed position. When in the stowed position, the step assembly is concealed underneath the pick-up truck.

13 Claims, 10 Drawing Sheets

U.S. PATENT DOCUMENTS

| | | | | |
|---|---|---|---|---|
| 4,842,325 A | * | 6/1989 | Irelan | 280/164.1 |
| 4,982,974 A | * | 1/1991 | Guidry | 182/91 |
| 4,991,789 A | * | 2/1991 | Buerger | 242/390.8 |
| 5,024,292 A | * | 6/1991 | Gilbreath et al. | 182/127 |
| 5,085,450 A | | 2/1992 | DeHart, Sr. | |
| 5,195,609 A | * | 3/1993 | Ham et al. | 182/90 |
| 5,342,073 A | | 8/1994 | Poole | |
| 5,375,864 A | * | 12/1994 | McDaniel | 182/89 |
| 5,498,012 A | | 3/1996 | McDaniel et al. | |
| 5,538,269 A | * | 7/1996 | McDaniel et al. | 182/89 |
| 5,624,127 A | * | 4/1997 | Arreola et al. | 182/127 |
| 5,716,064 A | | 2/1998 | Frerichs | |
| 5,799,962 A | * | 9/1998 | Barnhart | 108/131 |
| 5,803,475 A | * | 9/1998 | Dick | 280/163 |
| 5,842,709 A | | 12/1998 | Maccabee | |
| 6,149,172 A | * | 11/2000 | Pascoe et al. | 280/163 |
| 6,168,176 B1 | * | 1/2001 | Mueller | 182/88 |
| 6,170,842 B1 | * | 1/2001 | Mueller | 280/163 |
| 6,325,397 B1 | * | 12/2001 | Pascoe et al. | 280/163 |
| 6,357,773 B1 | * | 3/2002 | Griebel et al. | 280/166 |

\* cited by examiner

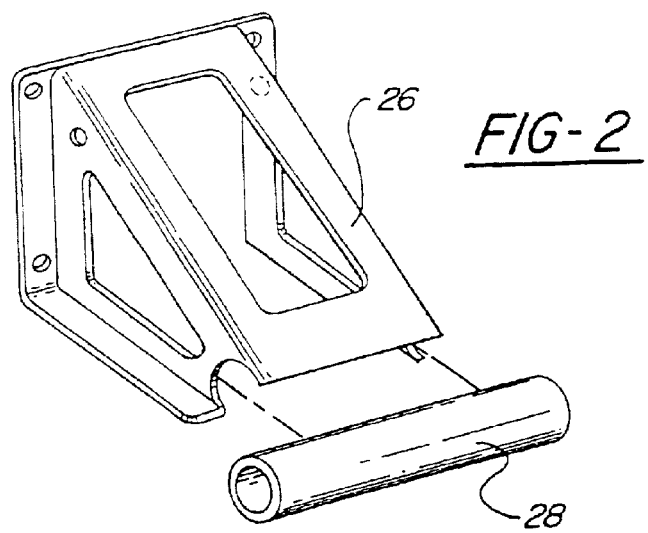
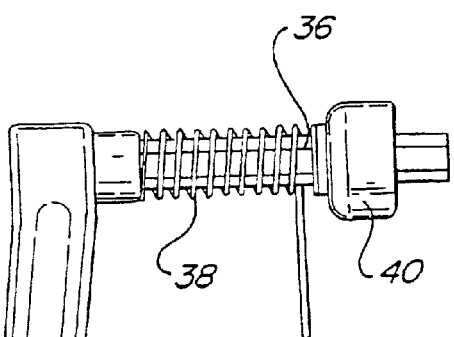
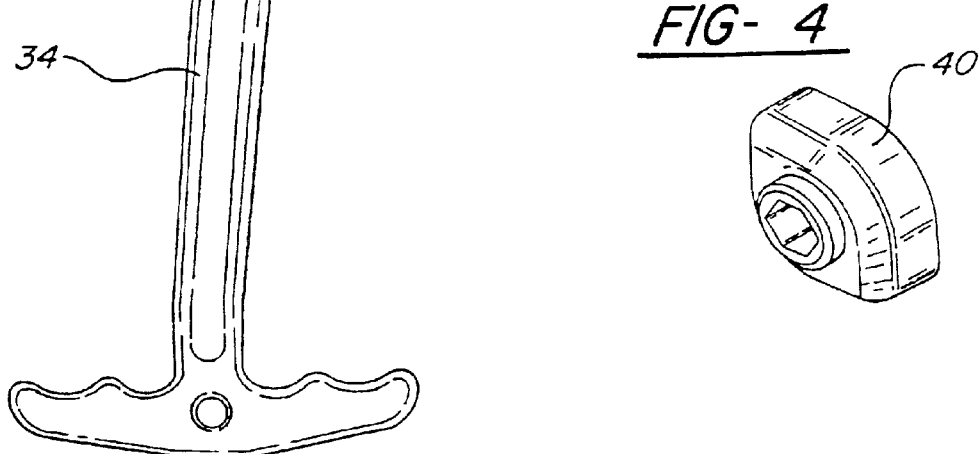

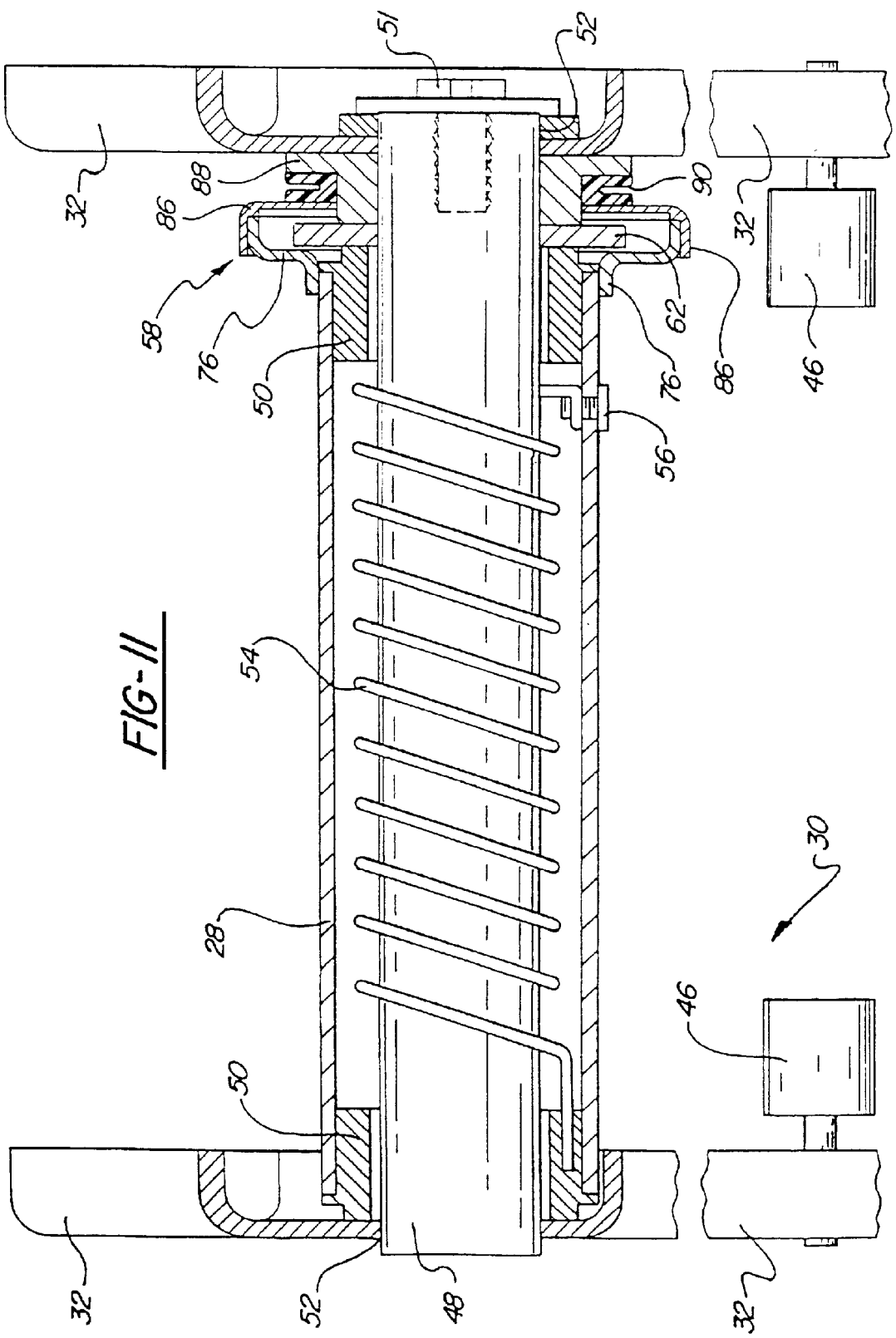

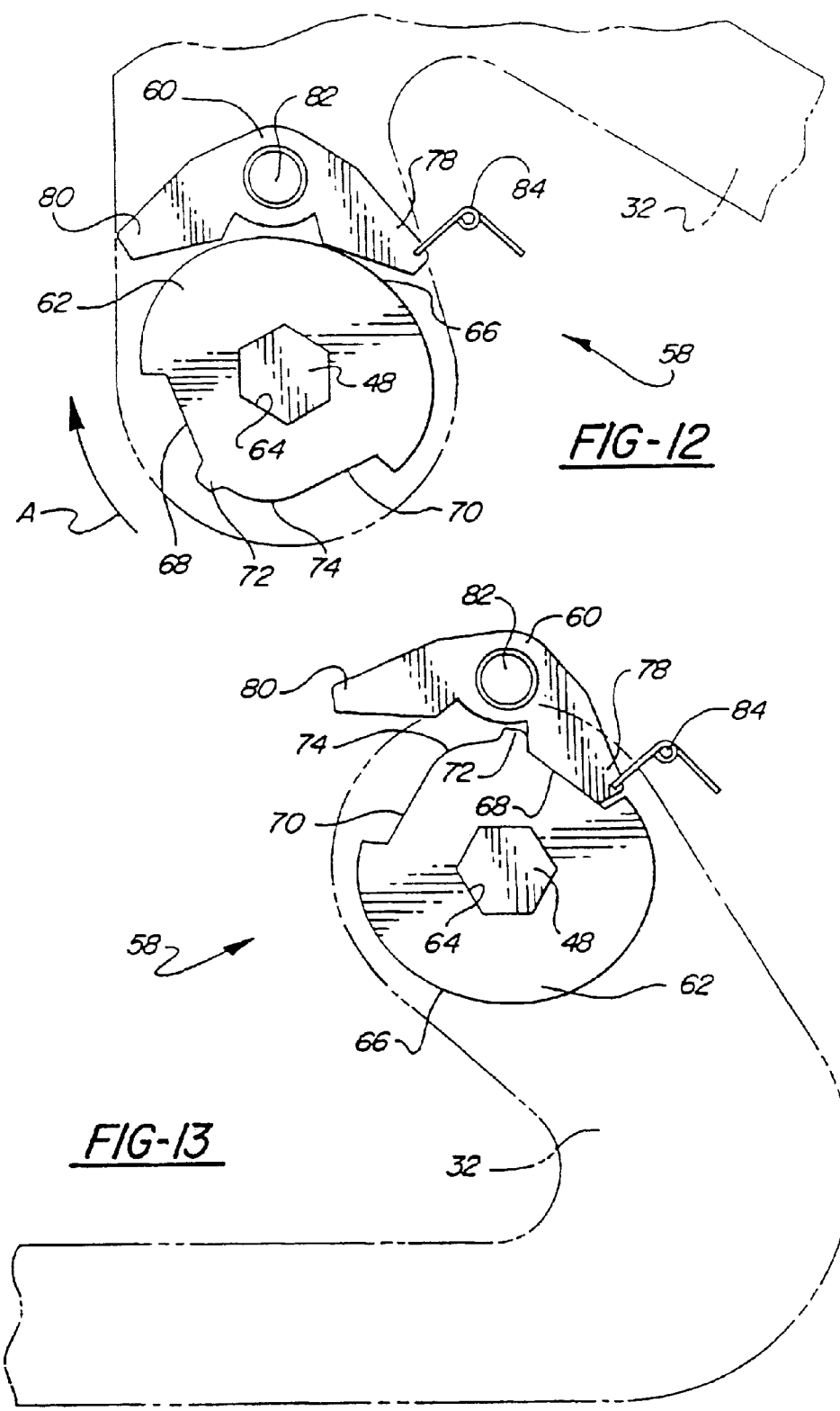

MANUAL RETRACTING BOX STEP FOR PICK-UP TRUCKS

This application is a 371 of PCT/CA00/00548 filed May 10, 2000 which claims benefit of provisional No. 60/133,282 filed May 10, 1999.

FIELD OF INVENTION

The subject invention relates to a box step assembly for a pick-up truck for enabling a user to easily access an interior of a pick-up truck bed.

BACKGROUND OF THE INVENTION

In recent years, the popularity of pick-up trucks has risen tremendously. The rear area of the truck bed is accessible through the tail gate. However if the rear area blocks access to the forward area, access is only available by going over the side wall of the truck bed. The truck bed is usually elevated because of the high ground clearance of these vehicles. As a result, it is very difficult to climb over the side wall.

Step structures have been used to assist passengers in entering and exiting pick-up trucks. On recent models of the Ford F-150 pick-up truck, a step is integrated with the outer side panel of the bed and positioned forwardly of the wheel well. The styling considerations restrict the depth and size of the step, presenting only a small stepping surface.

The patent literature has proposed various retractable vehicle step structures in order to resolve some of the problems associated with conventional step structures. For example, U.S. Pat. No. 5,716,064 proposes to provide a step that mounts to the forward suspension mount of the pick-up truck. The step is telescopically connected to the mounting bracket. The user pulls the step out for use and then pushes the step in when not in use and thereby conceal the step under the truck. This type of step detracts from the ground clearance of the truck. Further, this type of step is still visible when in the retracted and stored condition.

Other examples of prior art steps include U.S. Pat. Nos. 4,108,458 and 5,513,866.

The prior art solutions, however, have a number of deficiencies. One such deficiency is that many of these steps detract from the ground clearance of the vehicle. In addition, these steps are still visible, when in the retracted and stored position. Further, many of the manual step structures have no devices to assist in the movement between the stored and deployed positions such that the steps may become difficult to operate.

Accordingly it would be desirable to develop a step assembly which does not detract from the ground clearance of the vehicle, cannot be visible when in the stowed position, is easy to use and retract, and has an adequate stepping surface.

SUMMARY OF THE INVENTION

The disadvantages of the prior art are overcome by the subject invention which includes a step assembly for use with a pick-up truck type vehicle. The step assembly includes a mounting bracket mounted to an under-carriage of the vehicle. A step is pivotally secured to the mounting bracket. The step can rotate between a stowed position and an operative position with the step extending from the bracket and the vehicle. A coil spring is mounted between the bracket and the step for continuously biasing the step toward the stowed position. A ratchet mechanism, having a pawl, a cam and an over-center spring, is mounted between the bracket and the step. The ratchet mechanism locks the step in the operative position in response to rotation of the step from the stowed position to the operative position. When in the operative position, a user can stand on the step assembly to access the bed of the pick-up truck. The ratchet mechanism also unlocks the step in response to over rotation of the step beyond the operative position. Once unlocked, the step automatically counter rotates back to the stowed position.

Preferably, the step assembly is configured to retract behind the outer body panel such that the ground clearance is not impeded and the majority of the step is not visible when in the stowed position. The subject step assembly is easy to operate from and to the stowed position. Finally, the step has a relatively large stepping surface for the user.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is an exploded perspective view of a mounting bracket of the step assembly of FIG. 1;

FIG. 3 is a side elevational view of a handle for the step assembly of FIG. 1;

FIG. 4 is a perspective view of a mounting lobe for the handle of FIG. 3;

FIG. 11 is a perspective view of the step assembly of FIG. 5 in an over-rotated or releasing position;

FIG. 12 is a side view of a ratchet mechanism of the step assembly of FIG. 5 shown in the stowed position;

FIG. 13 is a side view of the ratchet mechanism of the step assembly of FIG. 5 shown in the deployed position;

DETAILED DESCRIPTION OF THE PREFERRED EMBODIMENT

Figure 1:
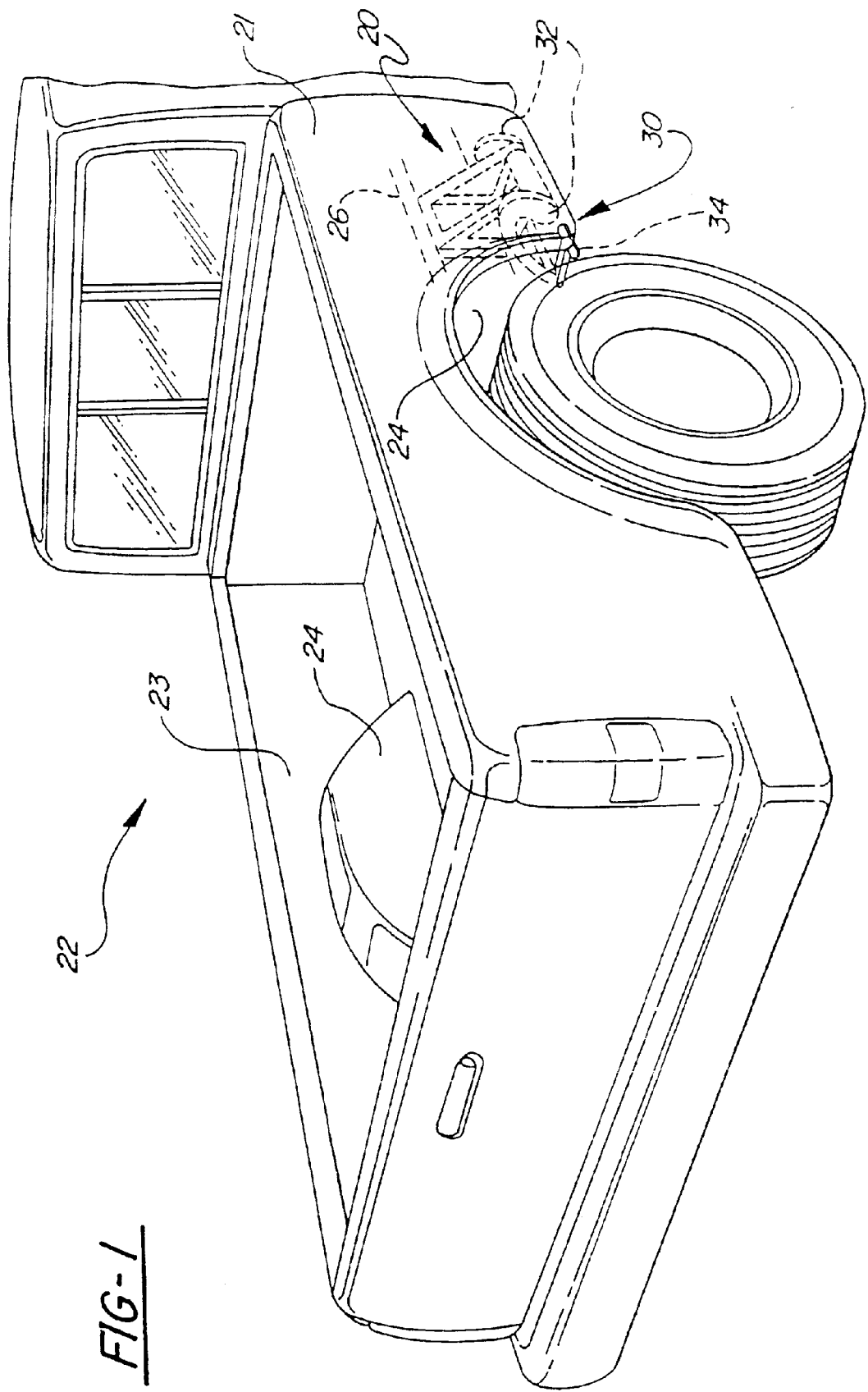
FIG. 1 is a perspective view of the present invention with the step assembly shown in a stowed position.

Referring to the Figures, wherein like numerals indicate like or corresponding parts throughout the several views, a box step assembly for use with a vehicle 22 is generally shown at 20 in FIG. 1.

The box step assembly 20 is preferably used with a pick-up truck type vehicle 22 having side walls 21 defining a bed box 23 as illustrated. The step assembly 20 is shown mounted to the pick-up truck forward of a rear wheel well 24. It is appreciated, however, that the subject step assembly 20 may be used on any suitable type of vehicle at any desired location.

The box step assembly 20 includes a mounting bracket 26 which is adapted to be mounted to an under-carriage of the vehicle 22 by bolts or other suitable fasteners, such as rivets or fastening methods, such as welding.

Referring to FIG. 2, the mounting bracket 26 is shown in greater detail. The mounting bracket 26 has a generally triangular or wedge shaped frame. The wedged shaped frame is preferably formed of sheet steel and has apertures on the surfaces thereof to reduce the weight of the bracket 26. A hollow tube 28 is preferably welded onto the bracket 26 at the forward apex of thereof. Flanges 27 extend from the bracket 26 to present a mounting surface. A secondary bracket (not shown) may be mounted to a mounting end of the bracket 26 to configure the mounting bracket 26 for various vehicles. Hence, the mounting bracket 26 of the subject invention is designed for utilization on virtually any vehicle.

Figure 5:
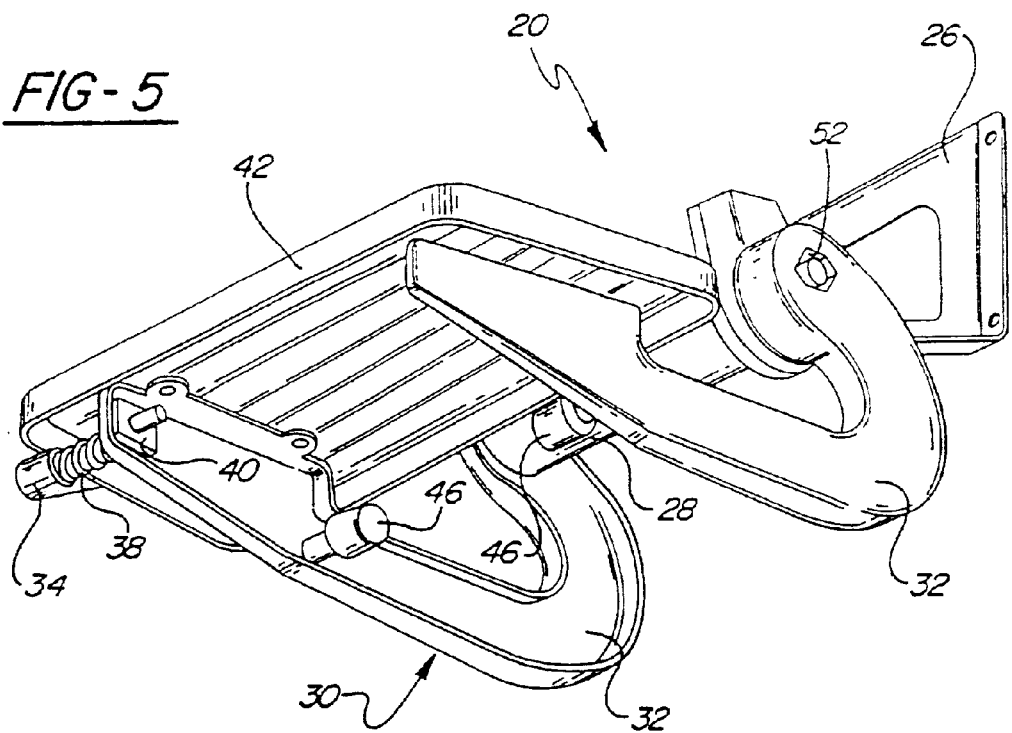
FIG. 5 is a perspective view of an underside of the step assembly of the present invention.

Referring to FIG. 5, a step 30 is pivotally secured to the mounting bracket 26 for rotation between a stowed position (as shown in FIG. 1) with the step 30 disposed adjacent the mounting bracket 26 and an operative or deployed position with the step 30 extending from the bracket 26. The step 30 preferably includes a pair of arcuate or J-shaped arms 32 pivotally mounted at the tip of the "J" to the tube 28. The arms 32 are preferably stamped from sheet steel and can be made in left and right hand versions. Alternatively, arms 32 may be made without a hand for universal application.

Figure 6:
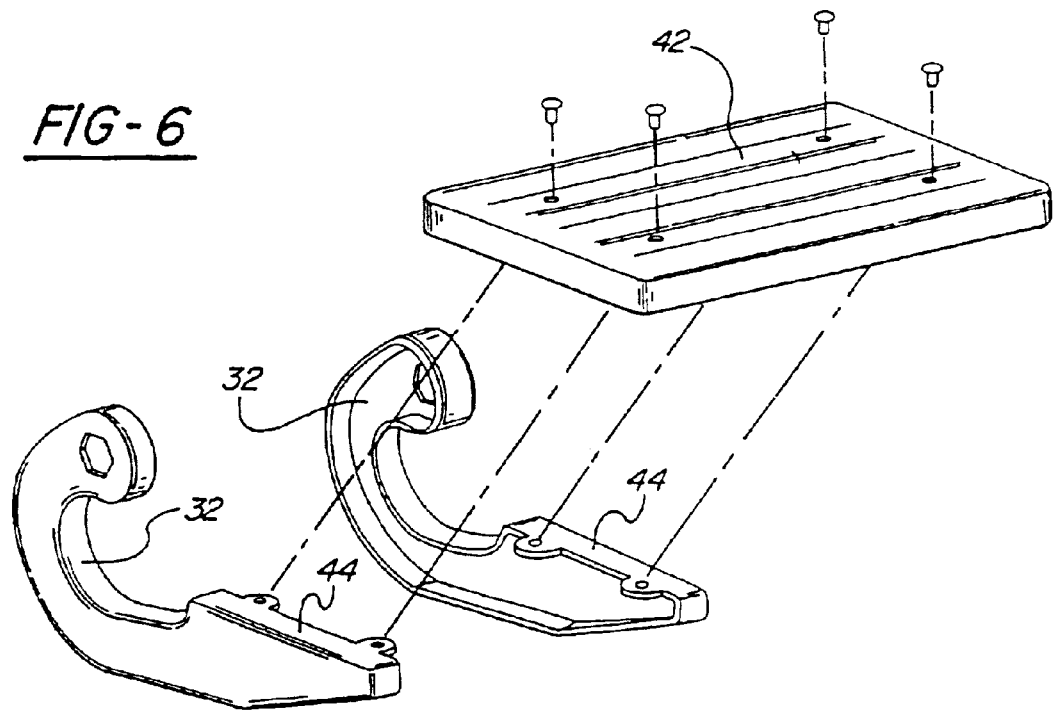
FIG. 6 is an exploded perspective view of the step assembly of FIG. 5.

Referring to FIG. 6, the step 30 has deck or platform 42 for providing a substantial stepping surface for the user. Each of the arms 32 has a flange 44 for interconnecting the platform 42 to the arms 32. The flange portions 44 may be integral (as shown) or may be separate sections bolted, welded, or otherwise affixed to the arms 32. The platform 42 may be formed of an integral plastic material (as shown) or may be a metal waffle board and a protective cover (not shown). Platform 42 is fastened to the arms 32 in a conventional manner, such as rivets, nuts and bolts, etc.

A handle 34 is pivotally mounted to the step 30. The handle 34 has a gripping portion connecting with a main shaft 37. A pivot shaft 36 extends from an end of the main shaft 37. A handle spring 38 is wound about the pivot shaft 36. A mounting cam 40 is secured to an end of the pivot shaft 36. Mounting cam 40 has two opposed lobes.

Handle is pivotally mounted to one of the arms 32. Spring 38 extends between the handle 34 and the step to continuously bias the handle 34 toward a retracted position. Mounting cam 40 secures the handle to the one arm 32. Cam 40 will engage the inner flange of the arm 32 to limit the travel of the handle 34 between the retracted position and the extended position. The handle 34 extends in a direction opposite the step 30 when the handle is in the retracted position (FIGS. 8 and 10) and extends in a same general direction as the step 30 when the handle 34 is in the extended position. When the step 30 is in the stowed position, the handle 34 will normally be in the retracted position. However, the handle 34 will be positioned to be presented to the user and within easy reach under the vehicle 22.

A bumper 46 is mounted to an inside face of each of the arms 32 below the platform 42 for limiting travel of the step 30 to the stowed position. Bumpers 46 also cushion the impact of the step 30 when it contacts the bracket 26.

Figure 7:
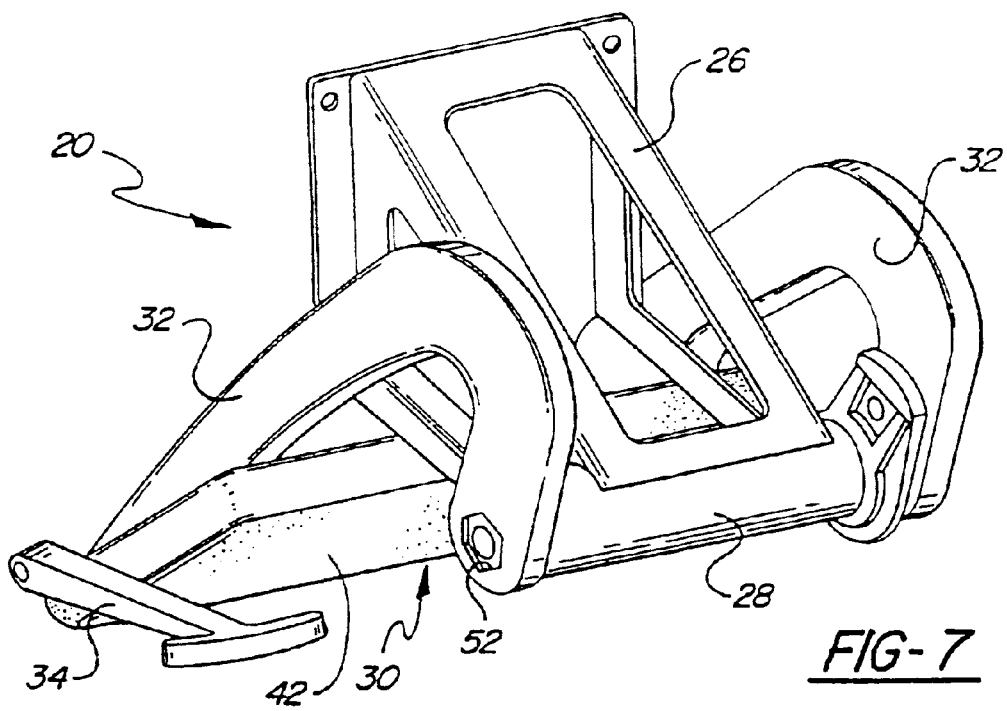
FIG. 7 is a cross-sectional view taken of the step assembly of FIG. 5.

Referring to FIG. 7, a shaft 48 is journal mounted to the tube 28 for rotation internally of the tube 28. Bushings 50 are disposed between the shaft 48 and the tube 28 to rotatably journal the shaft 48 to the tube 28.

The arms 32 are connected to each end of the shaft 48 such that the shaft 48 and arms 32 rotate as a single unit. The left arm 32, as viewed in FIG. 11, is welded to the shaft 48. The right arm 32 slides over the shaft 48 and is secured in place by a bolt 51. In addition, the shaft 48 preferably has an irregular circumferential configuration, such as hexagonal, which engages corresponding irregular punched apertures 52 in the arms 32. Preferably, the apertures 52 are punched at a tip of the J-shaped arms 32. The irregular configurations fully interlock the shaft 48 to the arms 32 for rotation as a single unit.

A spring 54 is mounted between the bracket 26 and the step 30 for continuously biasing the step 30 toward the stowed position The spring 54 is preferably wound about the shaft 48 with a first end mounted to the tube 28 and a second end mounted to the shaft 48 such that the shaft 48 is continuously biased to rotate the step 30 towards the stowed position. A pin 56 is inserted into the tube 28 to retain the first end of the spring 54. A second end is inserted into an aperture 57 is bushing 50. As appreciated, the biasing device 54 may be any suitable mechanism provided the step 30 is biased or at least maintained in the stowed position. In particular, a gas strut could be adapted to provide suitable biasing.

A ratchet mechanism, generally shown at 58, is mounted between the bracket 26 and the step 30. Referring also to FIG. 12, the ratchet mechanism 58 includes a pawl 60 interengaging a cam 62 for locking and unlocking the step 30.

The cam 62 is secured to the step 30 to pivot with the rotation of the step 30. Preferably, the cam 62 has a corresponding irregular opening 64, e.g. hexagonal, to interlock with the shaft 48 such that the shaft 48, cam 62, and arms 32 rotate as a unit. The cam 62 preferably has a circular configuration with a smooth annular outer surface 66 and first 68 and second 70 notches formed therein. The first notch 68 is smaller than the second notch 70. The cam 62 further includes an outwardly extending tab 72 disposed between the notches 68, 70 for selectively engaging the pawl 60 during the rotation of the step 30. A curved camming surface 74 merges smoothly with the tab 72 and the second notch 70.

The pawl 60 is pivotally mounted to the bracket 26 such that the cam 62 rotates relative to the pawl 60. In particular, an inner mounting flange 76 is fixedly secured to the tube 28 with the pawl 60 mounted to the mounting flange 76. The pawl 60 preferably has a crescent configuration with first 78 and second 80 abutment arms extending on opposites sides of the pivot 82. The first 78 and second 80 abutment arms selectively engage the first 68 and second 70 notches, respectfully, during selective rotation of the step 30.

An over-center spring 84 is mounted on the mounting flange 76 and engages the pawl 60 for biasing the pawl 60 to either one of two conditions, namely a locking condition urging the pawl 60 into engagement with the first notch 68 and an unlocking condition urging the pawl 60 into engagement with the second notch 70.

An exterior cover 86 is secured to the inner mounting flange 76 and encompasses the ratchet mechanism 58. The cover 86 is preferably molded of plastic and is press fitted onto the flange 76. A seal support bushing 88 is mounted to the shaft 48 between the cam 62 and right arm 32. The exterior cover 86 terminates at the bushing 88. A seal 90 is disposed about the bushing 88 to seal the exterior cover 86 from the environment.

Figure 8:
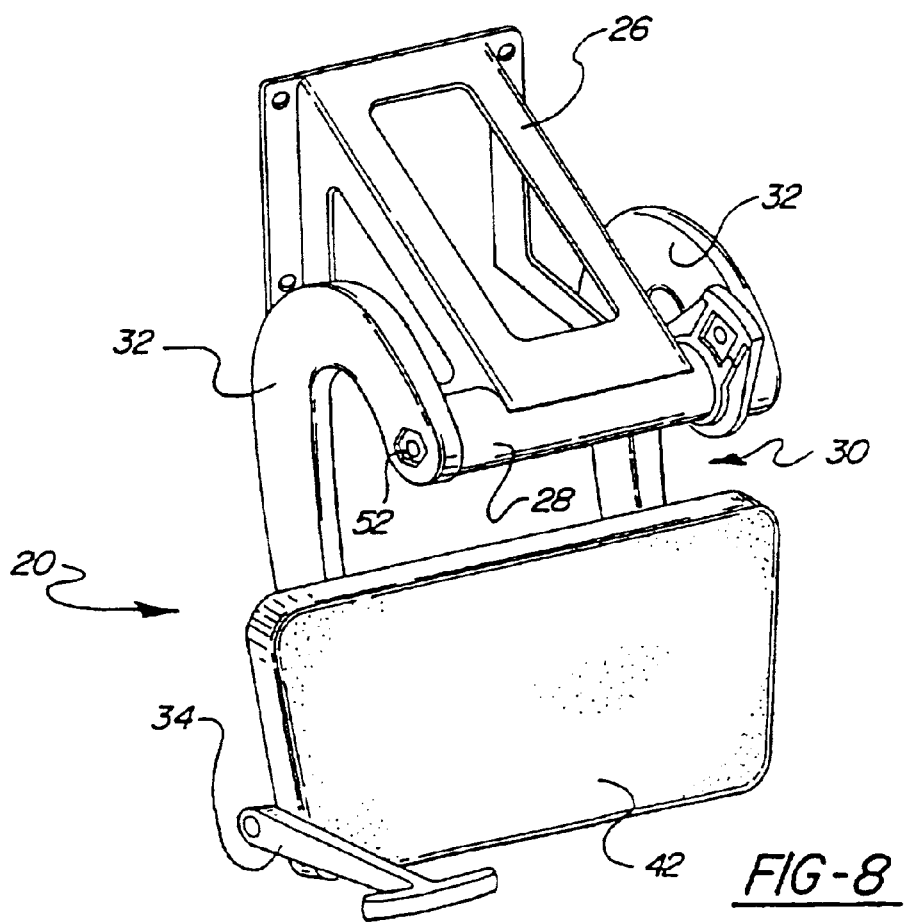
FIG. 8 is a perspective view of the step assembly of FIG. 5 shown in the stowed position.
Figure 9:
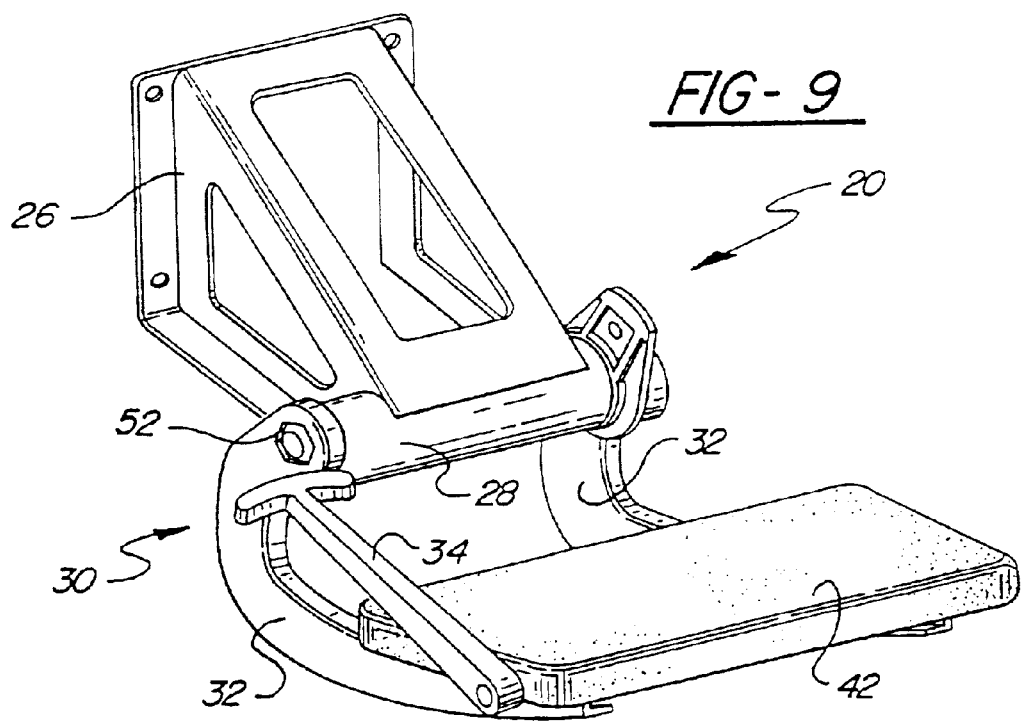
FIG. 9 is a perspective view of the step assembly of FIG. 5 shown in a partially deployed position.
Figure 10:
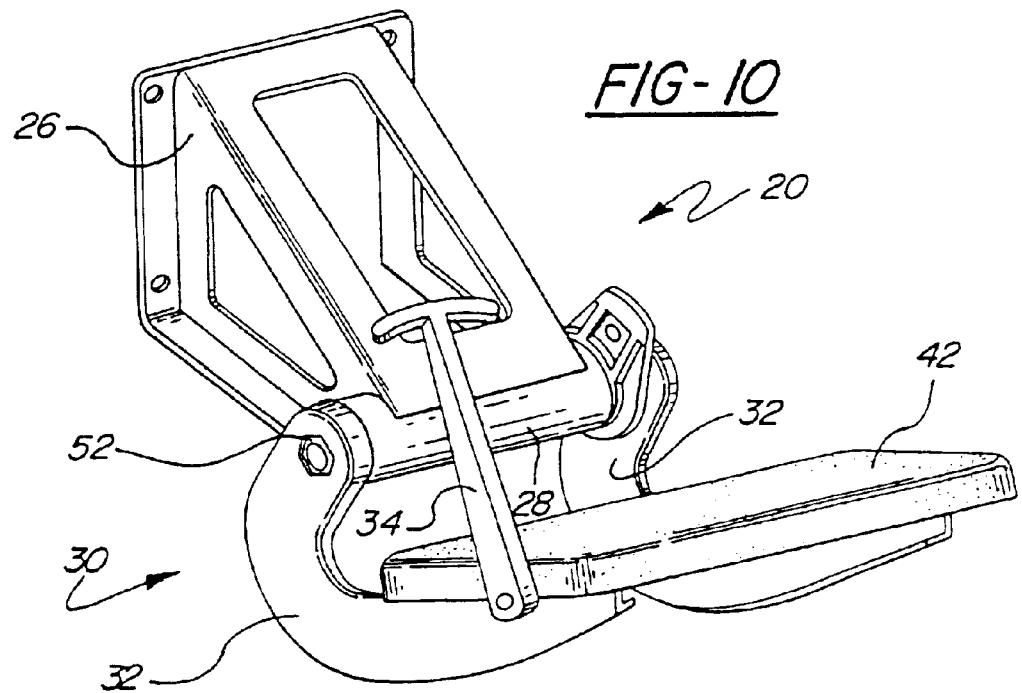
FIG. 10 is a perspective view of the step assembly of FIG. 5 shown in a fully deployed and operative position.

The particular movements and components of the entire step assembly 20 are best illustrated in FIGS. 8 through 11. FIG. 8 shows the step assembly 20 in the stowed position. FIG. 9 shows the step assembly 20 in a partially deployed position. FIG. 10 shown the step assembly 20 in the deployed position. FIG. 10 shows the step assembly 20 in the over-rotated position The user manipulates the handle 34 to move the step assembly 20 from the stowed position to the operative position. The user may also manipulate the handle 34 to move the step assembly 20 from the deployed position to the over-rotated position. Once the user releases the handle 34, the handle 34 is automatically returned to the retraced position such as shown in FIGS. 8 and 10.

Referring also to FIG. 12, the working components of the step assembly 20 as mounted to the bracket 26 which allow the step 30 to move, lock and release in the stowed, operative and deployed positions is illustrated.

The views of FIGS. 12 to 19 are taken from the right hand perspective of the step assembly 20. For illustrative purposes, the arm 32 is shown in phantom and is fragmented.

The coiled spring 54 biases the step 30 in the stowed position as shown in FIGS. 12, 1 and 7. The pawl 60 is urged toward the lock position by the over-center spring 84 such that arm 78 follows the annular outer surface 66 of the cam 62. To move the step assembly 20 to the operative position, the user first pulls on the handle 34 from underneath the vehicle 22.

As the handle 34 is pulled, the arms 32 and cam 62 rotate relative to the pawl 60 in the first direction which is shown at arrow A in FIG. 12. The cam 62 rotates relative to the pawl 60 until the first arm 78 drops into the first notch 68. Spring 84 will positively rotate the pawl 60 into engagement with the cam 62. A click or ratchet sound will signify the positive engagement. The first arm 78 will engage the cam 62 and will prevent counter rotation of the step 30. In this position, the step 30 will support the weight of the user stepping thereon. After the step 30 has locked into this position, the user will release the handle 34. The handle spring 38 automatically returns the handle 34 to the retracted position (shown in FIG. 9). The user can now stand on the platform 42 to access the bed box 23 over the side walls 21.

Figure 14:
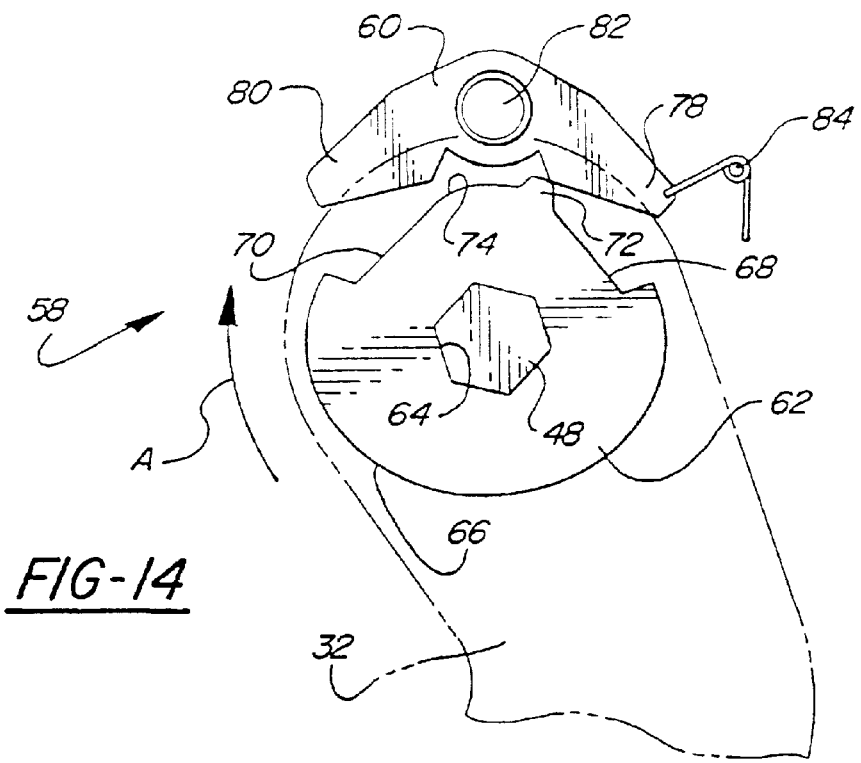
FIG. 14 is a side view of the ratchet mechanism of the step assembly of FIG. 5 shown initially being released and rotating in a first direction with a cam engaging a pawl to pivot the pawl to a second position.
Figure 15:
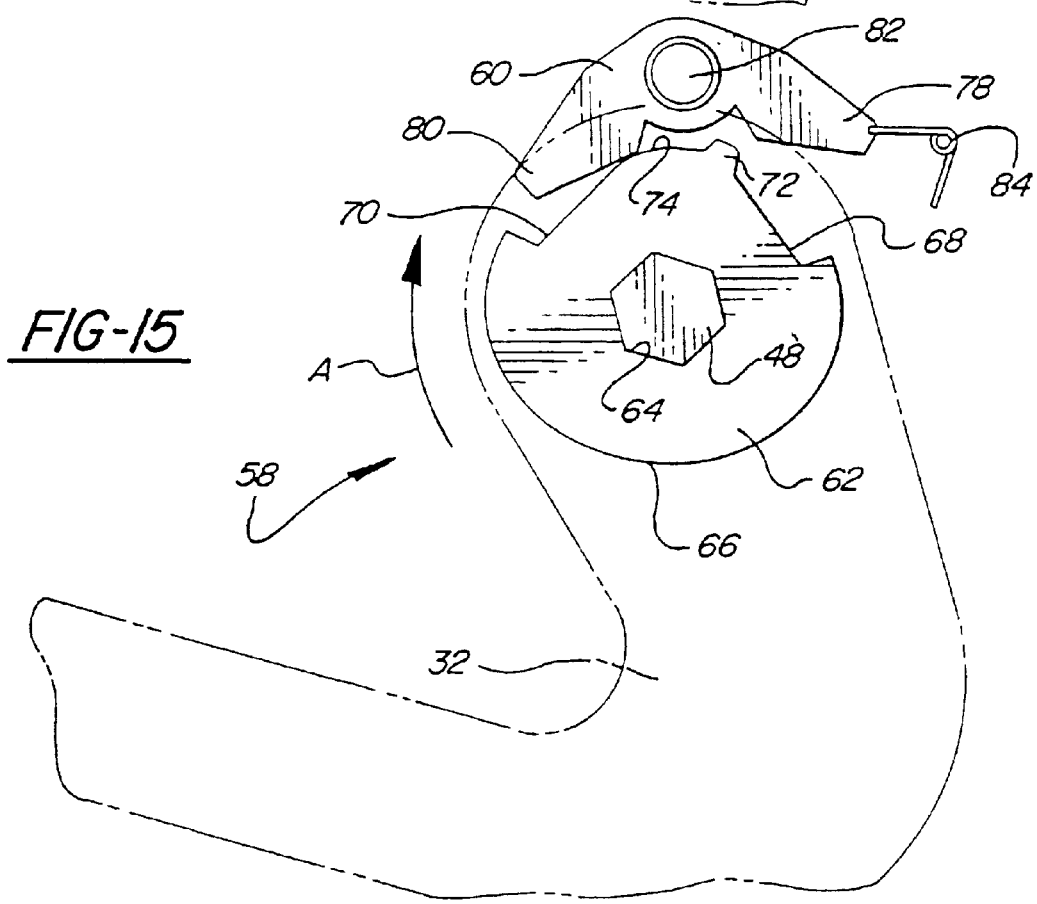
FIG. 15 is a side view of the ratchet mechanism of the step assembly of FIG. 5 shown when the step assembly is rotating in the first direction with the pawl being pivoted to the second position.
Figure 16:
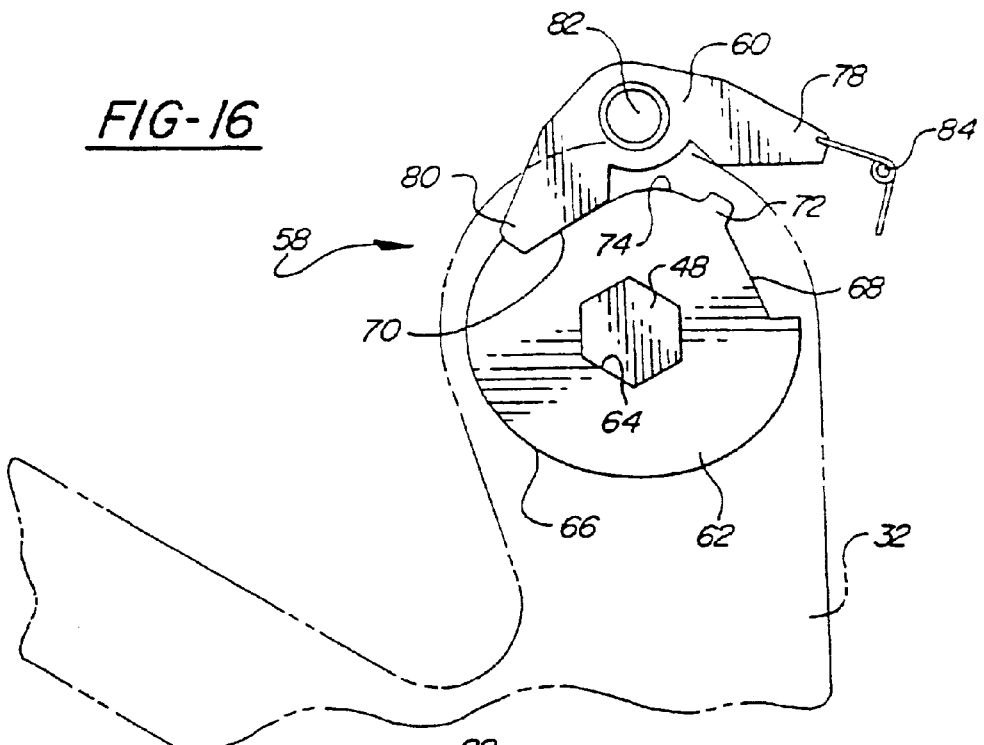
FIG. 16 is a side view of the ratchet mechanism of the step assembly of FIG. 5 shown when the step assembly is in the fully released position.

When it is desirable to return the step assembly 20 to the stowed position, the user pulls on the handle 34 (shown in FIG. 10). The ratchet mechanism 58 is designed to unlock the step 30 in response to over rotation of the step 30 in the first direction beyond the operative position. Specifically, the manipulation of the handle 34 rotates the arms 32 and the cam 62 again in the first direction such that the ratchet mechanism 58 begins to release as shown in FIG. 14. The tab 72 of the cam 62 engages the first arm 78 to pivot the pawl 60 such that the over-center spring 84 flips to urge the pawl 60 toward the unlocking position as shown in FIG. 15. Again a click or ratchet sound will signify the switching of conditions. The second arm 80 of the pawl 60 engages and follows the curved camming surface 74. Further rotation continues until the second arm 80 is fully seated in the second notch 70 as shown in FIG. 16 which limits rotation of the step assembly 20. The step assembly 20 is now in the fully released position.

Figure 17:
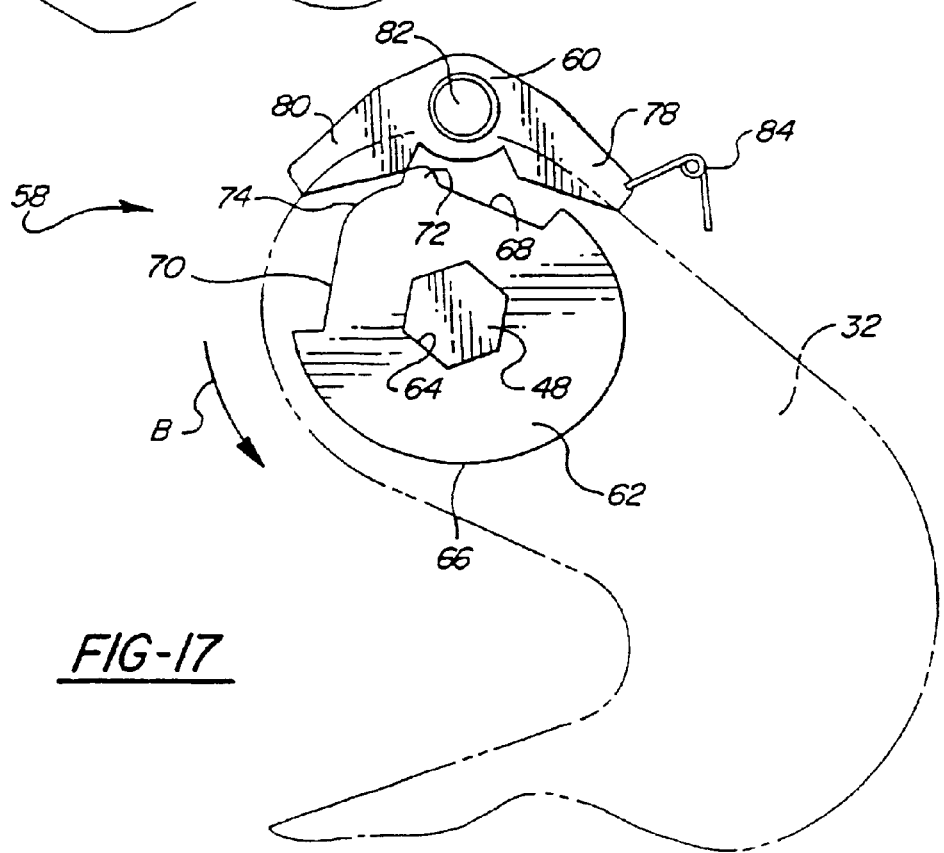
FIG. 17 is a side view of the ratchet mechanism of the step assembly of FIG. 5 shown when the step assembly is being returned to a stowed position.

The user can then allow the step assembly 20 to counter rotate, shown in FIG. 17 as arrow B, back to the stowed position. Specifically, the spring 54 rotates the shaft 48, arms 32, cam 62 and associated devices to return the entire step assembly 20 to the stowed position. As the spring 54 counter rotates the cam 62, the tab 72 will engage the second arm 80 to pivot the pawl 60 back toward the locking position as shown in FIG. 17. A click or ratchet sound will signify the change.

Figure 18:
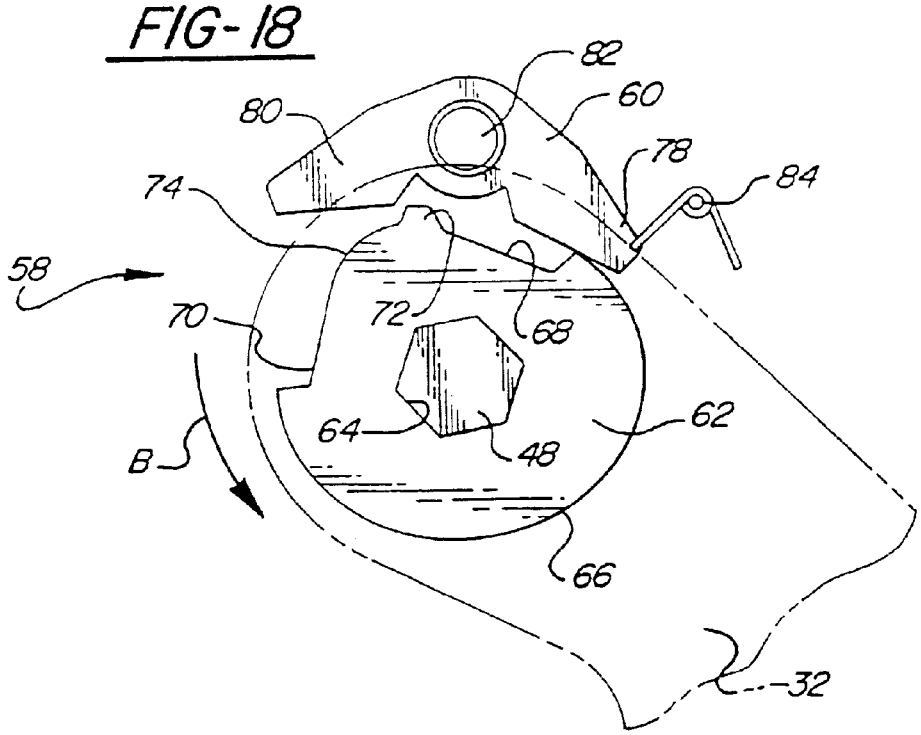
FIG. 18 is a side view of the ratchet mechanism of the step assembly of FIG. 5 shown when the step assembly is continuing to be returned to the stowed position and is rotating in the second direction with the pawl being pivoted to the first position.
Figure 19:
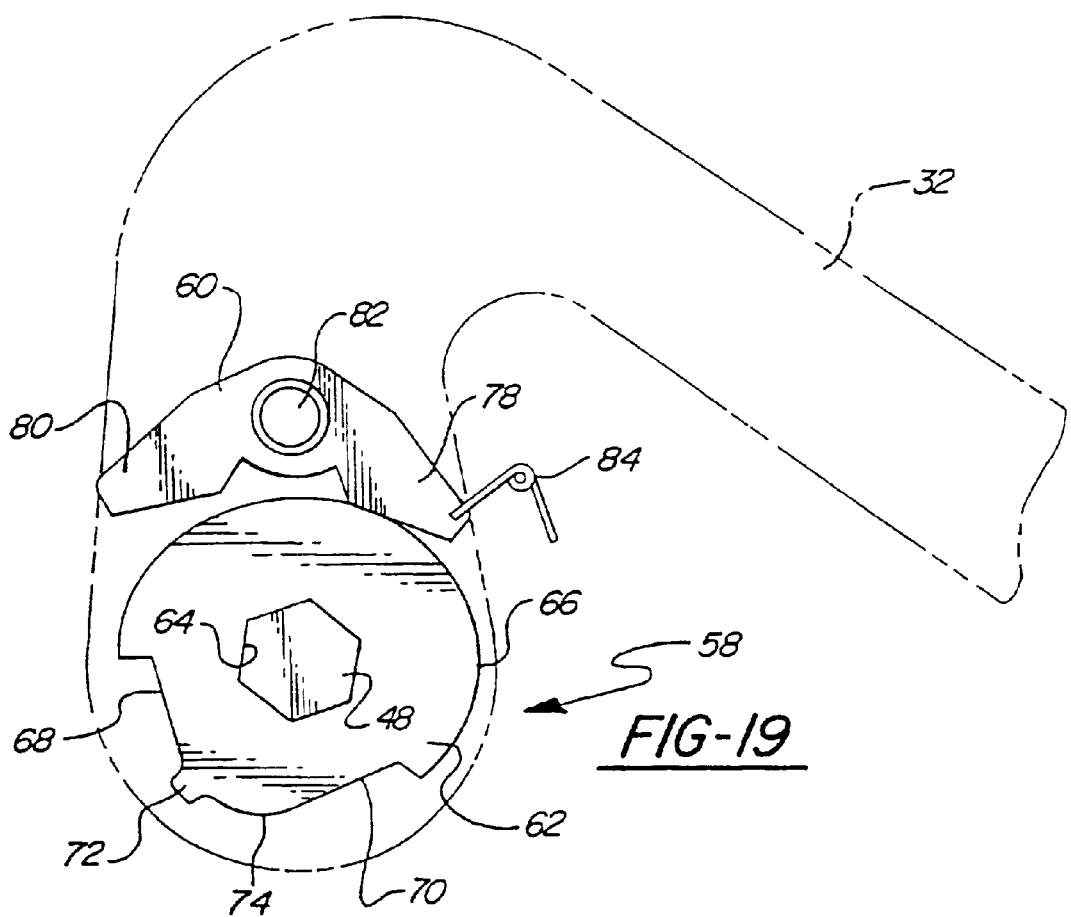
FIG. 19 is a side view of the ratchet mechanism of the step assembly of FIG. 5 shown when the step assembly has returned to the stowed position as also shown in FIG. 12.

Tab 72 is positioned such that when over-center spring flips to urge the pawl 60 to the unlocking position, the cam 62 has already rotated so that the abutment arm 78 will not re-engage the notch 68. The pawl 60 engages the annular outer surface 66 of the cam 62 as shown in FIG. 18. The arms 32 and cam 62 can therefore continue to be counter rotated, as shown by arrow B in FIG. 18, until the step assembly 20 has returned to the stowed position as shown in FIG. 19. The bumpers 46 engage the mounting bracket 26 to cushion the return rotation of the step 30.

The invention has been described in an illustrative manner, and it is to be understood that the terminology which has been used is intended to be in the nature of words of description rather than of limitation. Many modifications and variations of the present invention are possible in light of the above teachings. It is, therefore, to be understood that within the scope of the appended claims the invention may be practiced otherwise than as specifically described.

What is claim is:

1. A step assembly for use with a vehicle, said assembly comprising;
   a mounting bracket adapted to be mounted to the vehicle,
   a platform pivotally secured to said mounting bracket for rotation between a stowed position and am operative position,
   a biasing device mounted between said bracket and said platform for biasing said platform towards said stowed position, and
   a ratchet mechanism mounted between said bracket and said platform, said ratchet mechanism locking said platform in said operative position in response to rotation of said platform from said stowed position to said operative position and unlocking said platform in response to over rotation of said platform beyond said operative position and thereafter allowing said platform to counter rotate back to said stowed position, characterized by said platform having
      a pair of J-shaped arms pivotally secured to said bracket at a tip of each of the J-shaped arms,
      a handle pivotally mounted to said platform and manually movable between a retracted position and a deployed position, and
      a handle spring biasing said handle toward said retracted position, said handle extending in a direction opposite said platform when said handle is in said retracted handle position, and said handle extending in a same general direction as said platform when said handle is in said deployed position.

2. An assembly as set forth in claim 1 wherein said ratchet mechanism includes a pawl, a cam and an over-center spring, said pawl operatively engaging said cam locking and unlocking said platform and said over-center spring biases said pawl to either a locking or unlocking condition.

3. An assembly as set forth in claim 2 wherein said pawl has a crescent configuration with first and second abutment arms, said pawl being pivotally mounted to said bracket at a pivot point between said abutment arms, and said cam is secured to said platform to pivot therewith and rotate relative to said pawl.

4. An assembly as set forth in claim 3 wherein said cam has a circular configuration with first and second notches formed therein, said first and second notches separated by a tab, said first arm selectively engaging said first notch when said pawl is in the locking condition during said rotation of said platform thereby limiting counter rotation thereof at said operative position, said second arm selectively engaging said second notch during said over rotation of said platform limiting over rotation thereof, and said tab switches said pawl to the unlocking condition upon over rotation and to the locking condition upon counter rotation.

5. An assembly as claimed in claim 4 wherein said tab and said first notch are positioned so that when the pawl switches from the unlock condition to the lock condition, the pawl is unable to become seated in the first notch.

6. An assembly as set forth in claim 2 wherein said mounting bracket includes a hollow tube and said J-shaped arms are connected by a shaft, said shaft journal mounted in said tube.

7. An assembly as set forth in claim 6 further comprising a bumper mounted to at least one of said arms, said bumper positioned to engage said bracket to limit counter rotation of said platform in said stowed position.

8. An assembly as set forth in claim 7 wherein said spring is wound about said shaft with a first end mounted to said tube and a second end mounted to said shaft.

9. An assembly as set forth in claim 8 further including a flange fixedly secured to said tube with said pawl mounted to said mounting flange.

10. An assembly as set forth in claim 9 further including an exterior cover secured to said flange and encompassing said ratchet mechanism.

11. An assembly as set forth in claim 10 wherein said platform includes a stepping surface for a user.

12. An assembly as set forth in claim 11 wherein each of said arms include a flange portion for interconnecting said platform to said arms.

13. An assembly as set forth in claim 12 wherein said handle includes a shaft pivotally mounting said handle to one of said arms of said platform and said handle spring is wound about said handle shaft.

* * * * *

UNITED STATES PATENT AND TRADEMARK OFFICE
CERTIFICATE OF CORRECTION

PATENT NO.    : 6,533,303 B1
DATED         : March 18, 2003
INVENTOR(S)   : Brad E. Watson It is certified that error appears in the above-identified patent and that said Letters Patent is hereby corrected as shown below:

Column 2,
Line 26, delete "the" and insert -- a -- therefor.

Column 3,
Line 32, delete "of".
Line 50, insert -- a -- between "has" and "deck".

Column 4,
Line 34, insert -- . -- between "position" and "The".
Line 40, delete "is" and insert -- in -- therefor.

Column 5,
Line 24, delete "shown" and insert -- shows -- therefor.
Line 26, insert -- . -- after "position".
Line 32, delete "retraced" and insert -- retracted -- therefor Column 6,
Line 47, delete "am" and insert -- an -- therefor.
Line 62, delete "the" and insert -- said -- therefor.

Column 7,
Lines 28 and 30, delete "the" and insert -- said -- therefor.
Line 29, delete "the" and insert -- said -- therefore to read ", said pawl".

Signed and Sealed this

Fifth Day of August, 2003

JAMES E. ROGAN
*Director of the United States Patent and Trademark Office*